Patented Oct. 9, 1951

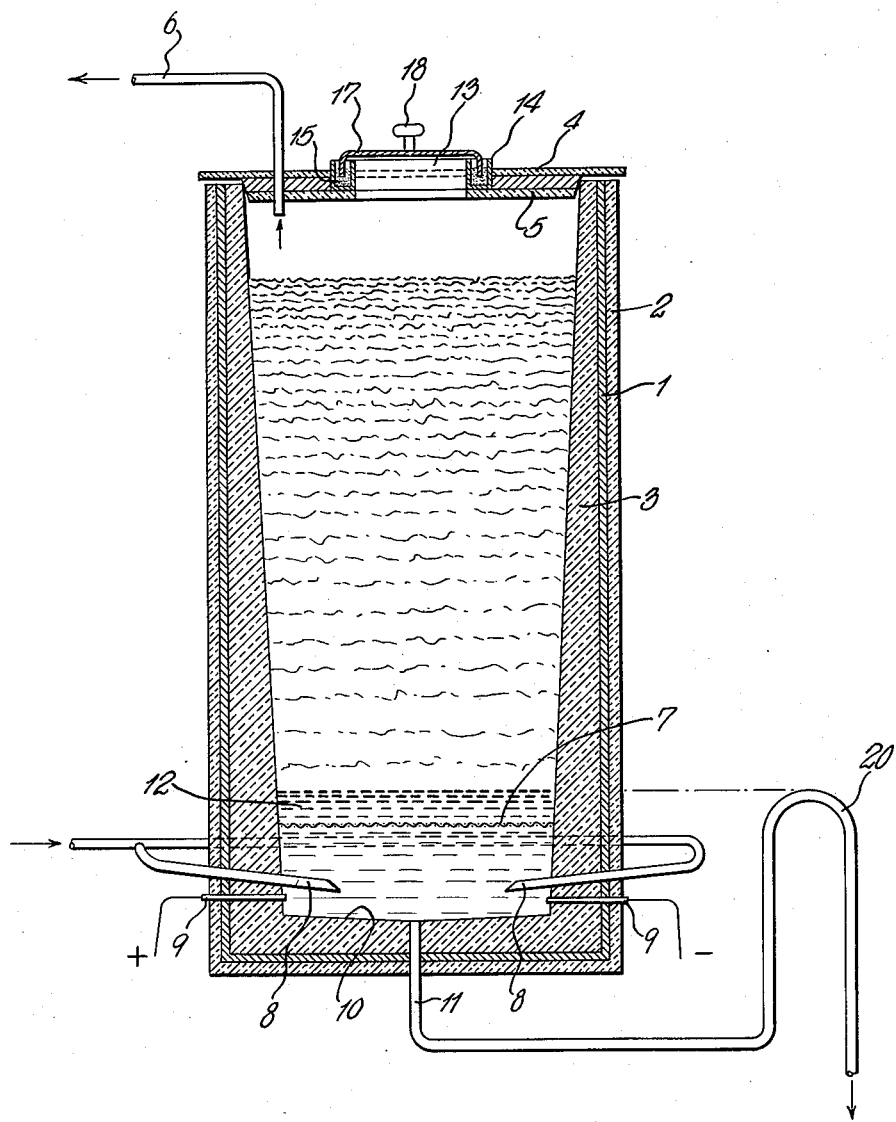

2,570,924

UNITED STATES PATENT OFFICE 2,570,924

METHOD OF PRODUCING PHOSPHORUS OXYCHLORIDE

Paul Dupont, Paris, France, assignor to Societe Anonyme des Manufactures des Glaces et Produits Chimiques de Saint-Gobain, Chauny & Cirey, Paris, France Application May 14, 1947, Serial No. 748,099
In France August 16, 1944

Section 1, Public Law 690, August 8, 1946
Patent expires August 16, 1964

3 Claims. (Cl. 23—203)

This invention relates to the manufacture of phosphorous oxy-halides and particularly to the manufacture of phosphorous oxy-chloride by an improvement over the known process of subjecting an ortho phosphate or a meta phosphate of calcium to the reaction of chlorine in the presence of a reducing agent, such as carbon. Phosphorous oxy-chloride is a particularly valuable member of the class of compounds that can be made by this process and the invention will be described with particular relation thereto.

This invention includes an improvement in process and an improvement in apparatus, over the known method wherein the basic reaction is expressed by the equation $$Ca_3(PO_4)_2 + 6C + 6Cl_2 \rightarrow 2POCl_3 + 3CaCl_2 + 6CO$$

when the halogen is chlorine and the ortho phosphate is used.

The process of the prior art is generally carried out at a relatively high temperature, of the order of 300° C., and in some cases it is even recommended that the temperature employed lie between 500° and 750° C. in order to cause partial fusion of the calcium chloride formed which, if allowed to remain in the solid state, slows up the reaction between the chlorine and the phosphate.

It is also known that, if the ortho phosphate be replaced by calcium meta phosphate, the reaction is expressed by the following equation:

$$Ca(PO_3)_2 + 4C + 4Cl_2 \rightarrow 2POCl_3 + CaCl_2 + 4CO$$

and the quantity of chlorine consumed in producing a given quantity of phosphorous oxy-chloride is only two-thirds of that which is required when starting from tri-calcium phosphate. Hence, operating in accordance with this reaction may be more advantageous.

The present invention comprises an improved process for the manufacture of phosphorous oxy-chloride, utilizing reactions of the type indicated above. In a preferred embodiment the calcium chloride formed at the start of the reaction is utilized as a source of heat by passing an electric current through it.

As a preliminary step, in order to initiate the reaction, the temperature in the reaction chamber is raised to about 800° C., by the aid of any kind of associated heating means, so that the calcium chloride formed passes into the liquid state and accumulates at the bottom of the reaction chamber, which is provided at this level with current-supply means. The heating means in the drawing is a pair of electrodes 9. Initial heating can be begun by admitting mixed carbon and $CaCl_2$ between the electrodes to carry the current until the molten pool forms.

It is an advantage of my discovery that a relatively slow rate of generation of heat in the heating resistance thus constituted by the calcium chloride is sufficient to compensate for the heat losses of the process and apparatus and to maintain the temperature at about 800° C. The chlorine gas admitted at the base of the furnace through tuyères 8 attains the highest temperature of the furnace in the molten $CaCl_2$ and transfers that heat upward. Thus, one of the reactants acts as the heat transfer medium and foreign gases are excluded.

It is of advantage to cause the phosphatic ores to become immersed, at least in part, in the fused calcium chloride in order to insure a good transmission of heat to the mass in reaction, this expedient not checking the course of the reaction because the presence of fused calcium chloride in contact with the ores does not impede the action of the chlorine on the ores. It is probable that the CO liberated in the reaction above reacts in the upper and cooler part of the furnace according to the equation $$Ca_3(PO_4)_2 + 6CO + 6Cl_2 \rightarrow 2POCl_3 + 3CaCl_2 + 6CO_2$$

The electrical heating process according to the invention enables a precise and substantially uniform temperature to be maintained throughout the mass which is immersed in the fused calcium chloride, and in consequence, makes it possible to operate at a temperature substantially higher than those usually employed. The mean temperature may thus be brought close to the maximum temperature compatible with the continued resistance of the refractory walls of the reaction chamber to the action of the reducing mixture of chlorine and carbon. There is a considerable advantage in being able to operate at these higher temperatures because both yield and speed are increased. At 800° C. the yield reaches 97% of that theoretically possible.

Using the heating method of the invention, with the consequent easy and precise control of operations, and by employing as the refractories compact silico-aluminous products obtained by fusion in an electric furnace, the present applicant has been able to operate the process at 800° C., at which temperature all the calcium chloride formed in the reaction passes into the liquid state and flows freely, since the fusion temperature of pure calcium chloride is in the region of 770° C. The controlled removal of the calcium chloride is thus made easy and may be effected, for example, by means of a siphon arranged to maintain the liquid bath at a constant level.

The invention may be carried into practical effect by using as the reaction chamber, by way of a specific example, a vertical furnace of the type illustrated in vertical section on the accompanying drawing.

This furnace comprises a vat 1, preferably made of sheet steel, provided with a heat-insulating covering 2, and being of a height that is large compared with its other dimensions, so that total absorption of the chlorine may be assured. The furnace has a lining 3 preferably formed from fused and compacted refractory materials such as, for example, the product, known under the trade mark "Corhart," which is a refractory, with a base of silica and alumina that is obtained by fusion in the electric furnace. The upper end of the furnace 1 is hermetically closed by a cover 4 which has its inner face provided with a refractory lining 5 and may be provided with a hopper through which a mixture of phosphate and carbon is introduced in amounts corresponding to the progress of the reaction. The charging device is such, in all cases, that no gases can escape through the hopper at any time. The cover 4 is provided with an exhaust pipe 6 for the evacuation of the gases in the chamber, including the phosphorous oxy-chloride formed by the reaction.

The cover 4 is provided with a central opening 13 which is surrounded by a circular trough 14 filled with sand, 15, in which the edge of a cap 17 is buried to form a seal. A handle 18 serves to remove the cap for inspections, or for actions that do not require the removal of the cover 4. The cap 17 and the trough 14 may be made of nickel or other resistant ware.

The mixture of phosphate and carbon is supported on a grid 7 beneath which open nozzles 8 each delivering a current of chlorine which passes through the grid to react with the mixture. These nozzles are made from a material, such as cooled, nickel which is but slightly attacked by chlorine.

The current-supply electrodes 9 are mounted close to the bottom 10 of the furnace, into which opens a pipe 11 for the drawing off of the molten calcium chloride 12 under the control of a siphon 20, maintained at about 800° C. by an auxiliary electrical heating.

In order to initiate the reaction, the temperature may be raised to 800° C. by some auxiliary heating means. When molten calcium chloride 12 has accumulated at the bottom of the vat, electric current is passed through its mass and the auxiliary heating means is shut off. The temperature of the bath 12 is thus maintained at a suitable valve by the heat generated in the calcium chloride. The siphon regulating the drawing off of the liquid from the bath 12 is so arranged that the liquid rises above the grid 7 and immerses part of the mixture of phosphate and carbon.

The phosphate and carbon ought to be mixed together as intimately as possible, this necessitating fine subdivision of the materials. However, it is necessary to allow the chlorine to circulate through the mass, and it is consequently advantageous to make balls or briquettes by pressure from a ground mixture of natural tricalcium phosphate and wood charcoal. Only the minimum quantity of wood charcoal necessary to insure reaction with the phosphate should be employed and the formation of the balls may be facilitated by adding ammonium phosphate as a binder. Charges are fed to the furnace through the cover 17, at a rate equal to consumption in the reaction.

This invention is extensible to the preparation of other oxy-halides of phosphorous, but in pursuing the extension it must be remembered that different conditions of temperature and different reactivities occur. For instance $CaF_2$ melts at 1350° C. as compared to the 800° C. of $CaCl_2$, and has a different reactivity. This requires the use of a different furnace and a close check upon corrosion rates.

The process proceeds above the temperature at which the metallic halide becomes molten, and the temperature of highest efficiency may easily be determined for each phosphatic raw material. This will also be affected by the particular halides employed in the reaction.

The following example is for the purpose of illustration only.

*Example*

An agglomeration of natural calcium phosphate, coal of low ash content, and pitch having the following composition:

| | Kilos |
|---|---|
| Phosphate | 700 |
| Coal | 200 |
| Pitch | 100 | is coked at 800° C., so as to obtain a porous mass free from volatile ingredients. The coke agglomerate is put in a furnace of the type illustrated containing a bath of molten calcium chloride. 350 cu. m. of chloride is then admitted to the molten bath and passes up through the mass at high temperature and normal pressure. The computed useful yield was over 97% of the weight of the phosphorus in the phosphate.

This invention eliminates several treatments that were required in processes of the prior art, such as washing to eliminate the $CaCl_2$ that coated the reaction mass. It simplifies the problem of heat transfer by using a reactant gas as the transfer medium. It is thermally economical, the molten $CaCl_2$ serving as a heat reservoir the temperature of which is economically maintained by passing an electric current through it. The reaction proceeds more smoothly because it is possible to maintain a constant and high reaction temperature that tends to produce a uniform product. The product is uncontaminated by the contaminants found in certain prior art products.

As many apparently widely different embodiments of the present invention may be made without departing from the spirit and scope thereof, it is to be understood that the present invention is not limited to the specific embodiment, except as defined in the appended claims.

What is claimed is:

1. The method of preparing phosphorus oxychloride that comprises maintaining commingled calcium phosphate and carbon above a pool of molten $CaCl_2$, passing an electric current through the said pool to maintain it at a temperature circa 800° C., and passing chlorine gas through the pool into the reaction mass.

2. The method of making phosphorus oxychloride that includes the steps of maintaining a pool of molten calcium chloride at the reaction temperature of chlorine gas and calcium phosphate by passage of an electric current through it, supporting above and partly submerged in the pool a divided mass of calcium phosphate and carbon, and passing chlorine gas through the hot pool and into the mass at reaction temperature.

3. The method of producing phosphorus oxychloride that comprises heating and maintaining a pool of molten $CaCl_2$ in the bottom of a furnace at a temperature of about 800° C., so as to supply the heat necessary for reaction, maintaining a charge of a mixture of calcium phosphate and carbon above the pool and in contact only with the upper portion of the pool, introducing chlorine into the pool so as to ascend therethrough and through the charge, and withdrawing the phosphorus oxychloride from the upper portion of the charge.

PAUL DUPONT.

REFERENCES CITED

The following references are of record in the file of this patent:

UNITED STATES PATENTS

| Number | Name | Date |
| --- | --- | --- |
| 741,396 | Chalmot | Oct. 13, 1903 |
| 1,020,546 | Fleming | Mar. 19, 1912 |
| 1,169,817 | Helfenstein | Feb. 1, 1916 |
| 1,345,656 | Yunck | July 6, 1920 |
| 1,763,248 | Moore | June 10, 1930 |
| 1,884,656 | Gelissen | Oct. 25, 1932 |
| 2,089,689 | Cornelius | Aug. 10, 1937 |
| 2,290,961 | Heuer | July 28, 1942 |
| 2,354,753 | Holder | Aug. 1, 1944 |
| 2,386,529 | Wilson et al. | Oct. 9, 1945 |
| 2,440,456 | Alley et al. | Apr. 27, 1948 |

FOREIGN PATENTS

| Number | Country | Date |
| --- | --- | --- |
| 416,084 | Great Britain | Sept. 10, 1934 |

OTHER REFERENCES

"Industrial and Engineering Chemistry," Oct., 1933, pages 1080–1083, "Glass Lined Equipment in Chemical Industry."